United States Patent
Melvelle et al.

(10) Patent No.: US 10,822,748 B2
(45) Date of Patent: Nov. 3, 2020

(54) RAILWAY TRACK MAINTENANCE TROLLEY

(71) Applicant: MELVELLE EQUIPMENT CORP. PTY LTD, New South Wales (AU)

(72) Inventors: Andrew Melvelle, New South Wales (AU); Ben de Rooy, New South Wales (AU); Gary Morris, New South Wales (AU); Jason Casboult, New South Wales (AU)

(73) Assignee: Melvelle Equipment Corp. Pty Ltd, New South Wales (AU)

( * ) Notice: Subject to any disclaimer, the term of this patent is extended or adjusted under 35 U.S.C. 154(b) by 407 days.

(21) Appl. No.: 15/892,056

(22) Filed: Feb. 8, 2018

(65) Prior Publication Data

US 2019/0211511 A1 Jul. 11, 2019

(30) Foreign Application Priority Data

Jan. 5, 2018 (AU) ................................ 2018200100

(51) Int. Cl.
| | |
|---|---|
| *E01B 29/24* | (2006.01) |
| *B61D 15/08* | (2006.01) |
| *E01B 31/00* | (2006.01) |
| *E01B 29/32* | (2006.01) |
| *E01B 31/02* | (2006.01) |
| *B61D 15/12* | (2006.01) |

(52) U.S. Cl.
CPC .............. *E01B 29/24* (2013.01); *B61D 15/08* (2013.01); *E01B 29/32* (2013.01); *E01B 31/00* (2013.01); *E01B 31/02* (2013.01); *B60L 2200/26* (2013.01); *B61D 15/12* (2013.01); *E01B 2203/01* (2013.01)

(58) Field of Classification Search
CPC .......... E01B 29/24; E01B 29/32; E01B 31/00; E01B 31/02; B61D 15/08; B61D 15/12
See application file for complete search history.

(56) References Cited

U.S. PATENT DOCUMENTS

| | | | | |
|---|---|---|---|---|
| 4,068,593 | A * | 1/1978 | Leeves | ................... E01B 29/24 104/17.2 |
| 4,895,078 | A * | 1/1990 | Mancini | ................... E01B 29/13 104/8 |
| 5,839,377 | A * | 11/1998 | Brenny | ................... E01B 29/24 104/17.2 |
| 6,622,633 | B1 * | 9/2003 | Johnsen | ................... E01B 29/24 104/2 |
| 8,499,695 | B1 * | 8/2013 | Petkov | ................... E01B 29/24 104/17.2 |

(Continued)

FOREIGN PATENT DOCUMENTS

WO 2012083339 A1 6/2012

*Primary Examiner* — Jason C Smith
(74) *Attorney, Agent, or Firm* — Levenfeld Pearlstein, LLC

(57) ABSTRACT

A railway track trolley includes a pair of carriages and a workhead mounted to at least one of the pair of carriages. The carriage is adapted to locate on one of a pair of railway track whereas the other carriage locates on the other railway track. The carriages are interconnected via a coupling assembly to permit independent sliding of the carriages relative to one another. In operation, at least one of the carriages is moved along the corresponding railway track wherein its associated workhead is adapted to implement work at that railway track.

10 Claims, 10 Drawing Sheets

(56) References Cited

U.S. PATENT DOCUMENTS

| | | | | |
|---|---|---|---|---|
| 2013/0319279 A1* | 12/2013 | Melvelle | ................ | E01B 29/24 104/2 |
| 2015/0083015 A1* | 3/2015 | Noll | ....................... | E01B 27/16 104/12 |
| 2018/0223482 A1* | 8/2018 | Hamilton | ................ | E01B 31/20 |
| 2018/0347120 A1* | 12/2018 | Melvelle | ................ | E01B 29/24 |
| 2020/0024809 A1* | 1/2020 | Widlroither | ............ | E01B 31/17 |

* cited by examiner

US 10,822,748 B2

RAILWAY TRACK MAINTENANCE TROLLEY

TECHNICAL FIELD

The present invention relates broadly to a railway track trolley and relates particularly, although not exclusively, to a railway track maintenance or construction trolley.

BACKGROUND OF INVENTION

Maintenance trolleys are used in the rail industry to assist with both ongoing and periodic maintenance of the railway track and associated components such as rail clip fasteners. The trolley is typically arranged for rolling along an opposing pair of tracks, and a workhead mounted to the trolley is operated by a maintenance operator. In one application the workhead is designed for the insertion and/or removal of rail clip fasteners. The applicant has a unique rail clip remover which is the subject of patent protection in Australia and elsewhere, see PCT publication No. W02012/083339. Although this clip remover is a significant advance on competing designs, it nonetheless has the following drawbacks:
1. the single workhead must be moved across its trolley in order to access fasteners on the opposing track and this may be cumbersome to achieve without a risk of operator injury;
2. if the trolley is modified to accommodate two (2) workheads they cannot always be operated simultaneously as sleepers are not generally square to the associated track and thus opposing fasteners not aligned with the respective workheads;
3. the workhead is counterbalanced with the power source which means the workhead cannot be powered from an independent and external power source.

SUMMARY OF INVENTION

According to a first aspect of the present invention there is provided a railway track trolley comprising:
a pair of carriages each located on respective of a pair of railway tracks, the carriages being interconnected to permit independent sliding relative to one another;
a workhead mounted to at least one of the pair of carriages which is moved along the railway track on which it is located wherein the workhead is adapted to implement work at said railway track.

Preferably the trolley also comprises a coupling assembly slidably mounted to, and located between, the pair of carriages for their interconnection. More preferably the coupling assembly includes a pair of cars secured to one another and arranged to slide in concert within a corresponding traveller part of the respective pair of carriages. Even more preferably the pair of cars are retained by respective of the traveller parts of the pair of carriages for their independent sliding movements in a shuttle action. Still more preferably the pair of cars are detachably secured to one another to permit separation of the pair of carriages.

Preferably the coupling assembly includes locking means arranged to cooperate with one or both of the pair of carriages to restrict sliding movement of one or both of said carriages relative to the coupling assembly. More preferably the locking means includes a locking element dedicated to each of the cars for locking engagement with the respective carriage whereby locking one only of the locking elements restricts the range of sliding movement of the carriages relative to one another.

Preferably the trolley is powered for activation of the workhead via an associated power source. More preferably the associated power source is a power takeoff from a train located in close proximity to the trolley.

Preferably the workhead is mounted to the carriage via a boom assembly connected to the carriage. More preferably the boom assembly includes a pedestal connected to the carriage and from which a boom is pivotally mounted, the workhead mounted to an end of the boom. Even more preferably the boom assembly includes biasing means coupled between the carriage and the boom to urge it upward in supporting the weight of the associated workhead. Still more preferably the biasing means includes a hydraulically activated cylinder located between the boom and the carriage.

According to a second aspect of the invention there is provided a railway track trolley comprising:
a carriage located on one or both of a pair or railway tracks;
a boom assembly including a boom mounted to the carriage;
a workhead connected to the boom, the boom assembly including biasing means operatively coupled to the boom to urge it upward in supporting the weight of the workhead.

Preferably the boom assembly includes a pedestal connected to the carriage, the boom being pivotally mounted to the pedestal. More preferably the workhead is detachably mounted to an end of the boom.

Preferably the biasing means includes a hydraulically activated cylinder located between the boom and the carriage to urge the boom upward in supporting the weight of the workhead. More preferably the hydraulically activated cylinder is operatively coupled to a hydraulic control circuit which activates said cylinder so that it supports substantially the full weight of the workhead which effectively floats above the carriage. Even more preferably the hydraulic control circuit is associated with a hydraulic power source. Still more preferably the hydraulic power source includes a power takeoff from a train located in close proximity to the trolley.

BRIEF DESCRIPTION OF DRAWINGS

In order to achieve a better understanding of the nature of the present invention a preferred embodiment of a railway track trolley will now be described, by way of example only, with reference to the accompanying drawing in which.

DETAILED DESCRIPTION OF PREFERRED EMBODIMENT

Figure 1:
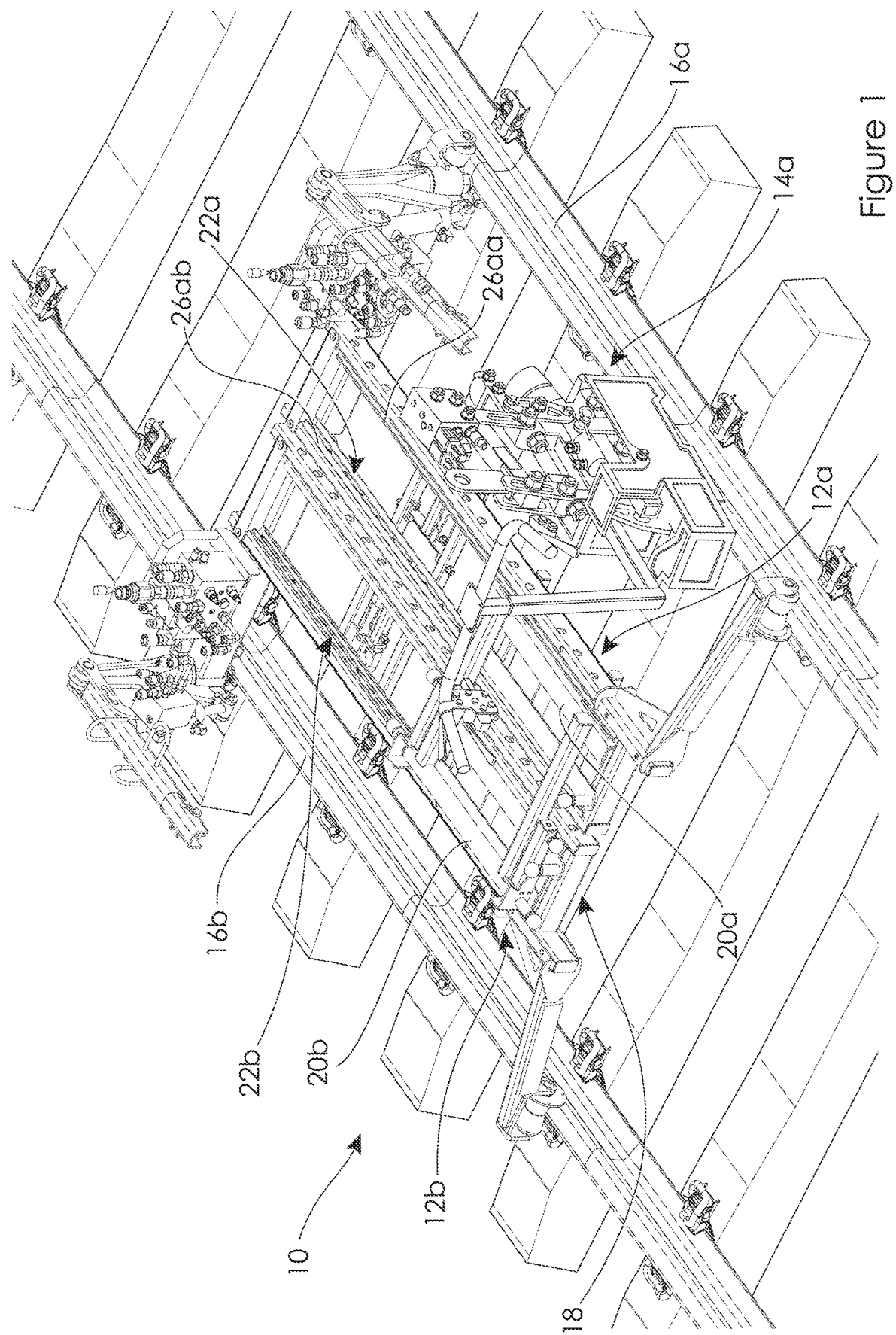
FIG. 1 is a perspective view of one embodiment of a railway track trolley according to the present invention.
Figure 2:
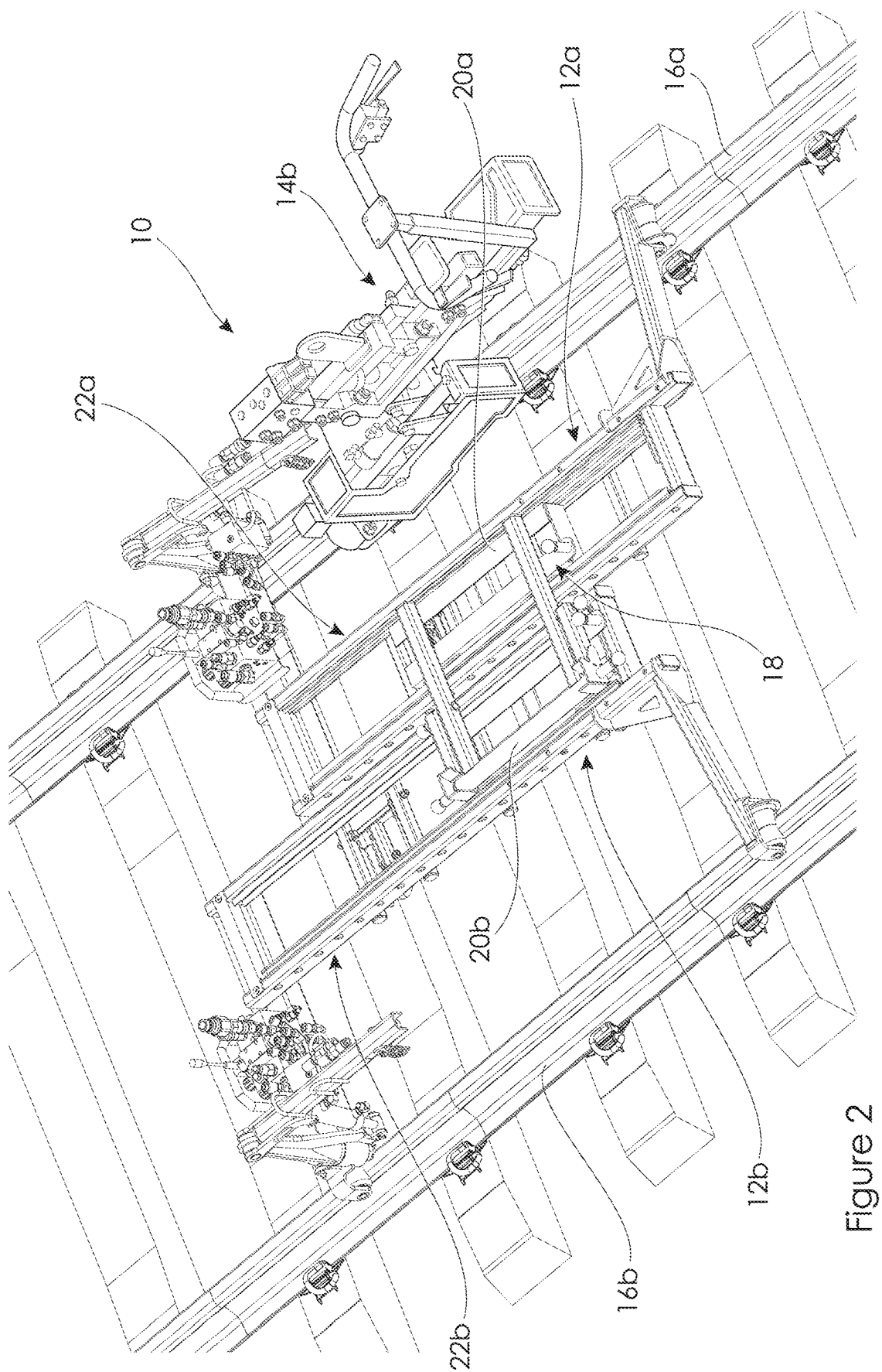
FIG. 2 is another perspective view of the railway track trolley of the embodiment of FIG. 1.

As shown in FIGS. 1 and 2 there is a railway track trolley 10 according to an embodiment of a first aspect of the invention. The railway track trolley 10 generally comprises a pair of carriages 12a and 12b, and a workhead such as 14a mounted to at least one of the pair of carriages such as 12a. The carriage 12a is adapted to locate on one of a pair of railway tracks 16a whereas the other carriage 12b locates on the other railway track 16b. The carriages 12a/b are interconnected via a coupling assembly 18 to permit independent sliding of the carriages 12a/b relative to one another. In operation, at least one of the carriages such as 12a is moved along the corresponding railway track 16a wherein its associated workhead 14a is adapted to implement work at that railway track 16a.

Figure 3:
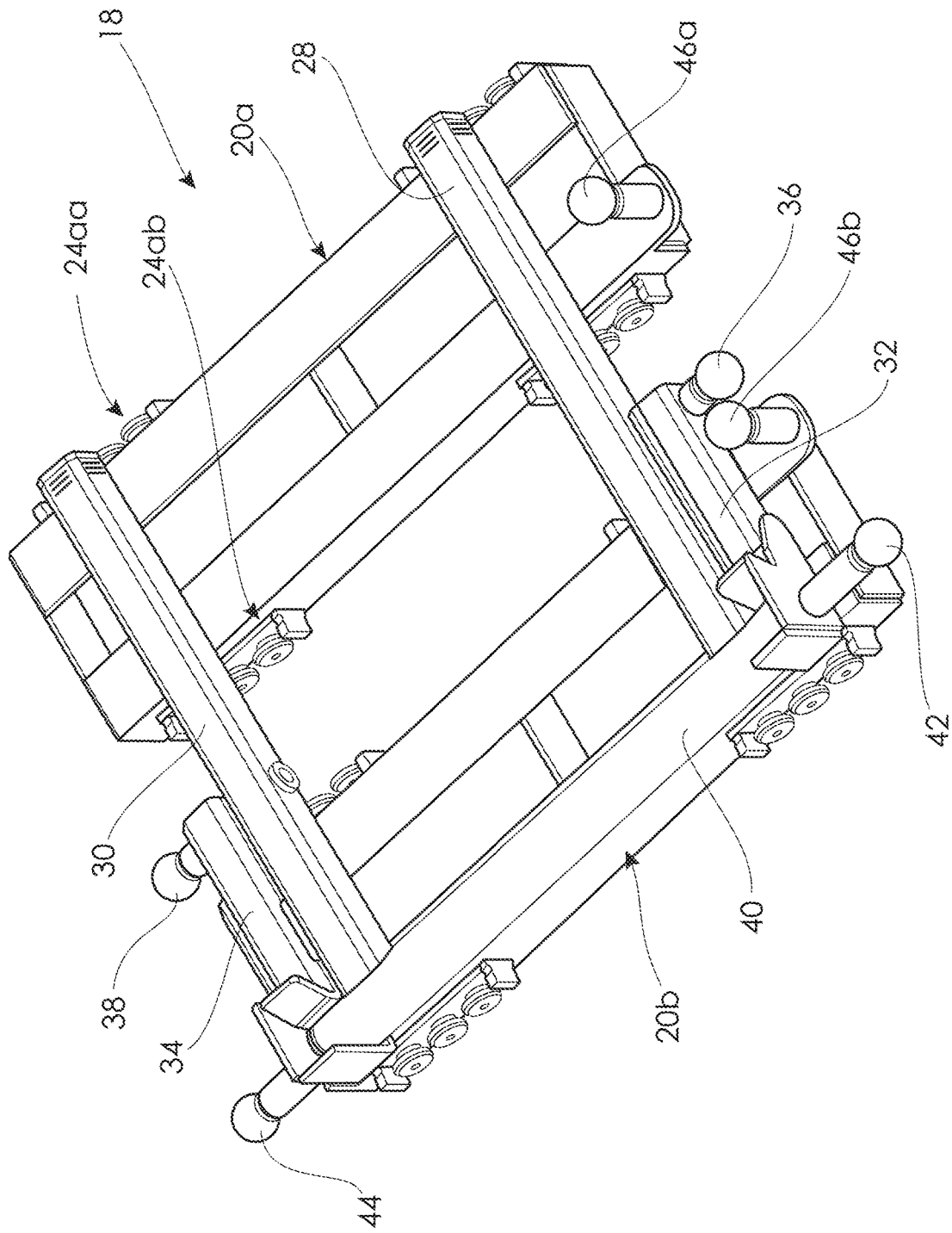
FIG. 3 is a perspective view of a coupling assembly taken from the embodiment of FIGS. 1 and 2.
Figure 4:
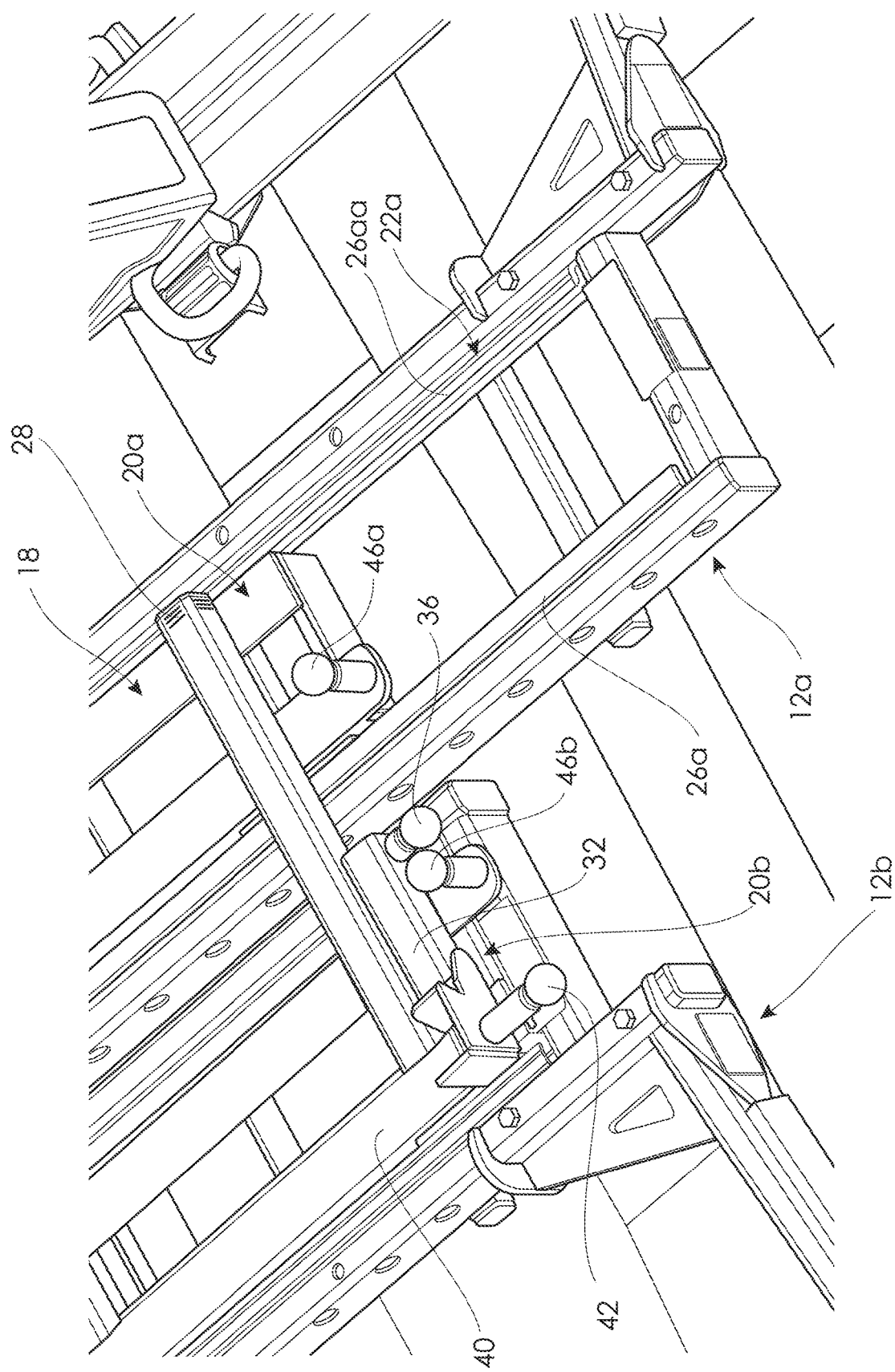
FIG. 4 is an enlarged perspective view of the coupling assembly cooperating with a pair of carriages taken from the railway track trolley of the embodiment of the preceding figures.
Figure 5:
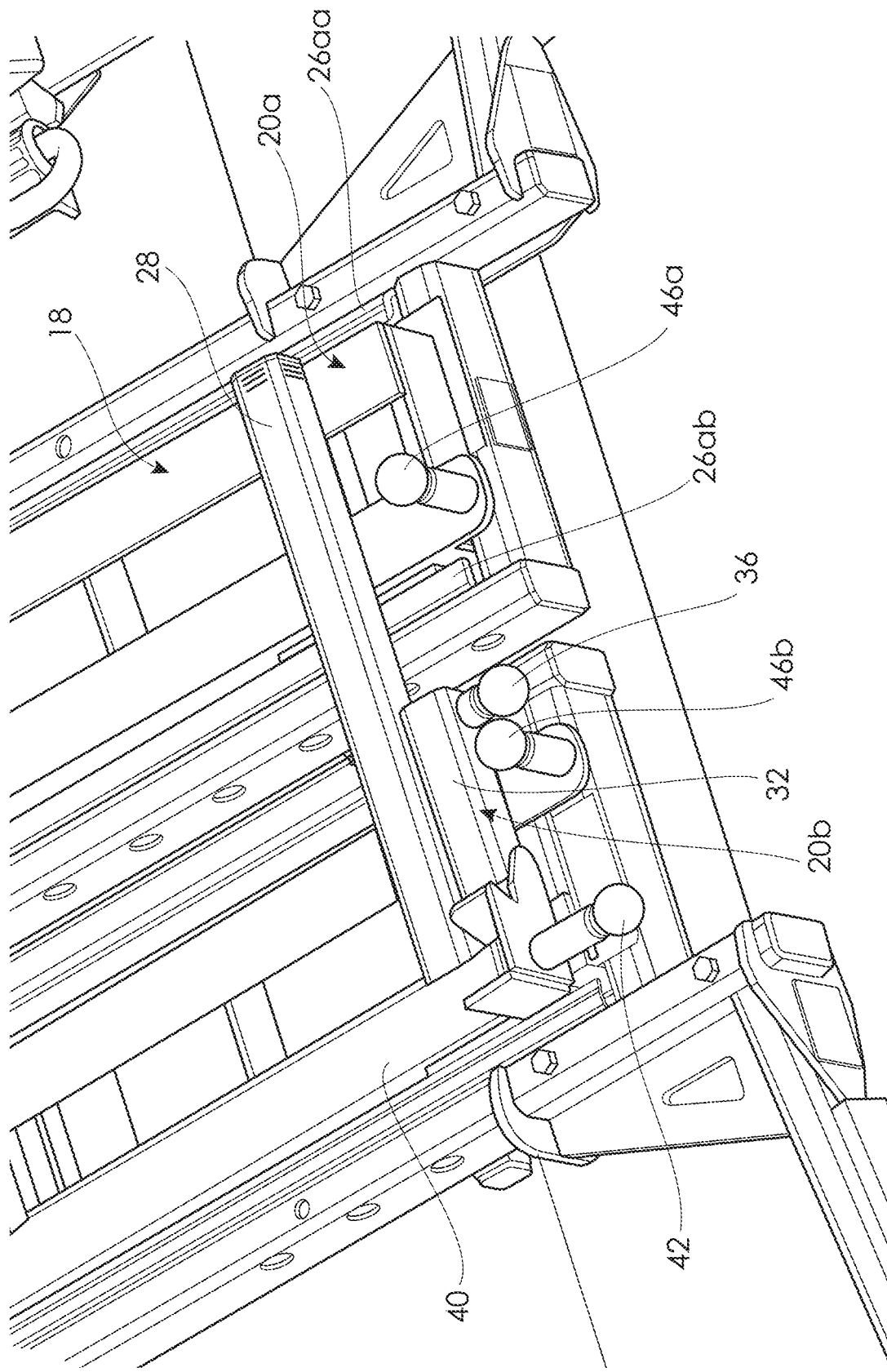
FIG. 5 is another enlarged perspective view of the coupling assembly and the pair of carriages of the preceding embodiment.

As best seen in FIGS. 3 to 5, the coupling assembly 18 of this embodiment is slidably mounted to, and located between, the pair of carriages 12a/b. The coupling assembly 18 includes a pair of cars 20a and 20b secured to one another and arranged to slide in concert within a corresponding traveller part 22a and 22b of the respective pair of carriages 12a and 12b. Each of the cars such as 20a includes two opposing pairs of rollers such as 24a a and 24a b retained by respective of opposing tracks 26a a and 26a b of the corresponding traveller part 22a of the carriage 12a. The pair of carriages 12a/b are thus arranged for independent sliding movement in a shuttle action.

In this embodiment the pair of cars 20a/b are secured to one another to permit separation of the pair of carriages 12a/b. One of the cars 20a is provided with a pair of transverse beams 28 and 30 releasably secured to the other car 20b. The other car 20b includes a pair of transverse members 32 and 34 designed to interlock with the crossbeams 28 and 30 via retractable locks 36 and 38 respectively. The crossbeams 28 and 30 are interconnected at a distal end via longitudinal member 40. The other car 20b includes another pair of releasable locks 42 and 44 designed to releasably engage the longitudinal member 40 for securement of the pair of cars 20a/b to one another.

Figure 6:
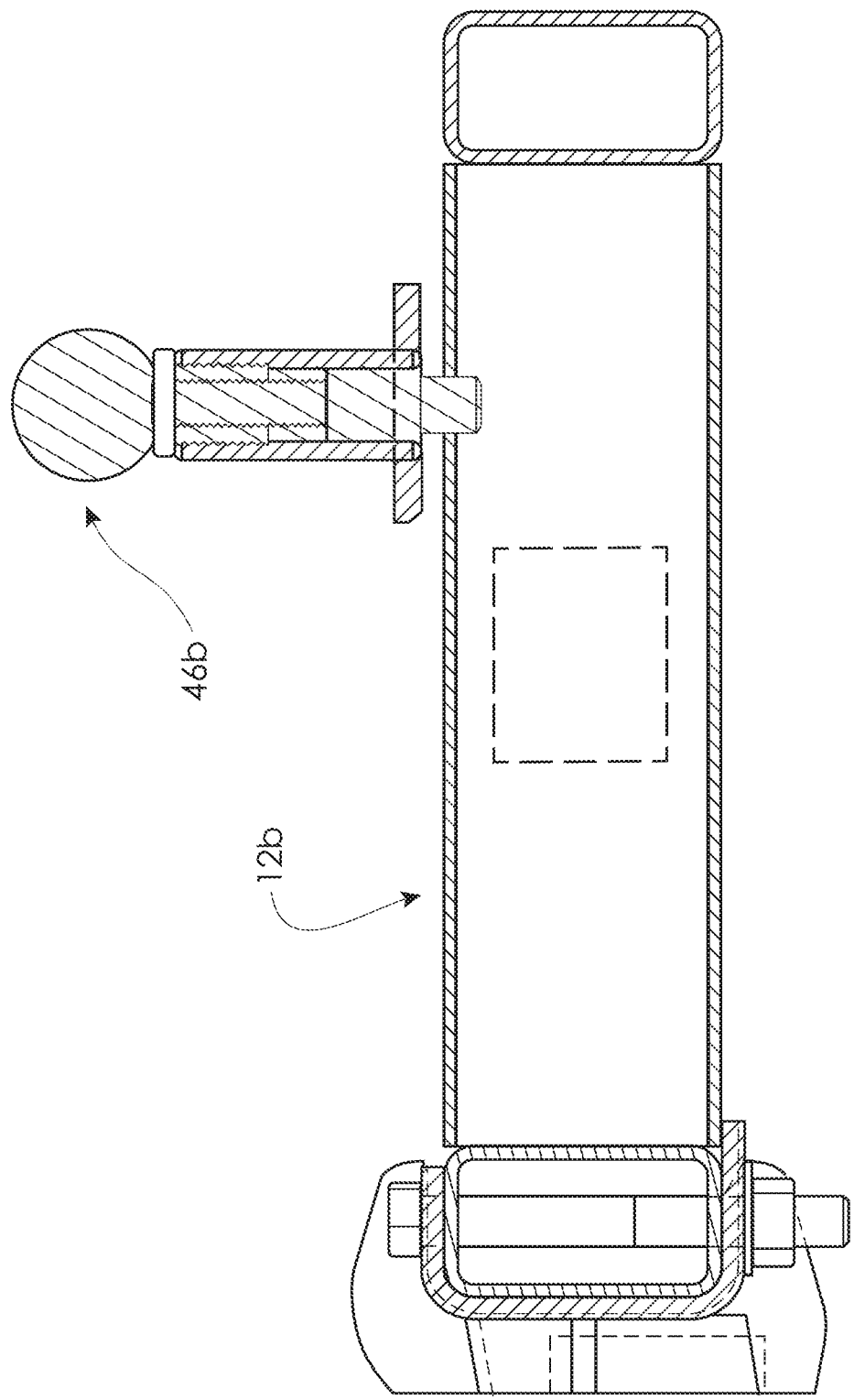
FIG. 6 is a sectional view taken in end elevation of part of the coupling assembly together with one of the pair of carriages taken from the railway track trolley of the preceding embodiment.

In this example the pair of cars 20a/b are retained in the corresponding traveller part 22a/b of the respective pair of carriages 12a/b. The coupling assembly 18 of this embodiment includes locking means in the form of a pair of releasable plungers 46a and 46b dedicated to respective of the cars 20a and 20b. The plungers 46a/b are arranged to cooperate with respective of the carriages 12a/b to restrict sliding movement of one or both of the carriages 12a/b relative to the coupling assembly 18. FIG. 4 shows locking engagement of one of the retractable plungers 46b with carriage 12b whilst the other retractable plunger 46a is released from the respective carriage 12a. It will be understood that this locking of one only of the retractable plungers such as 46b restricts the range of sliding movement of the carriages 12a/b relative to one another. FIG. 5 shows locking engagement of both of the retractable plungers 46a/b with the respective carriages 12a/b to prevent relative sliding movement of the carriages 12a/b relative to one another. FIG. 6 is a sectional view showing locking engagement of one of the retractable plungers such as 46b with the respective carriage 12b.

Figure 7:
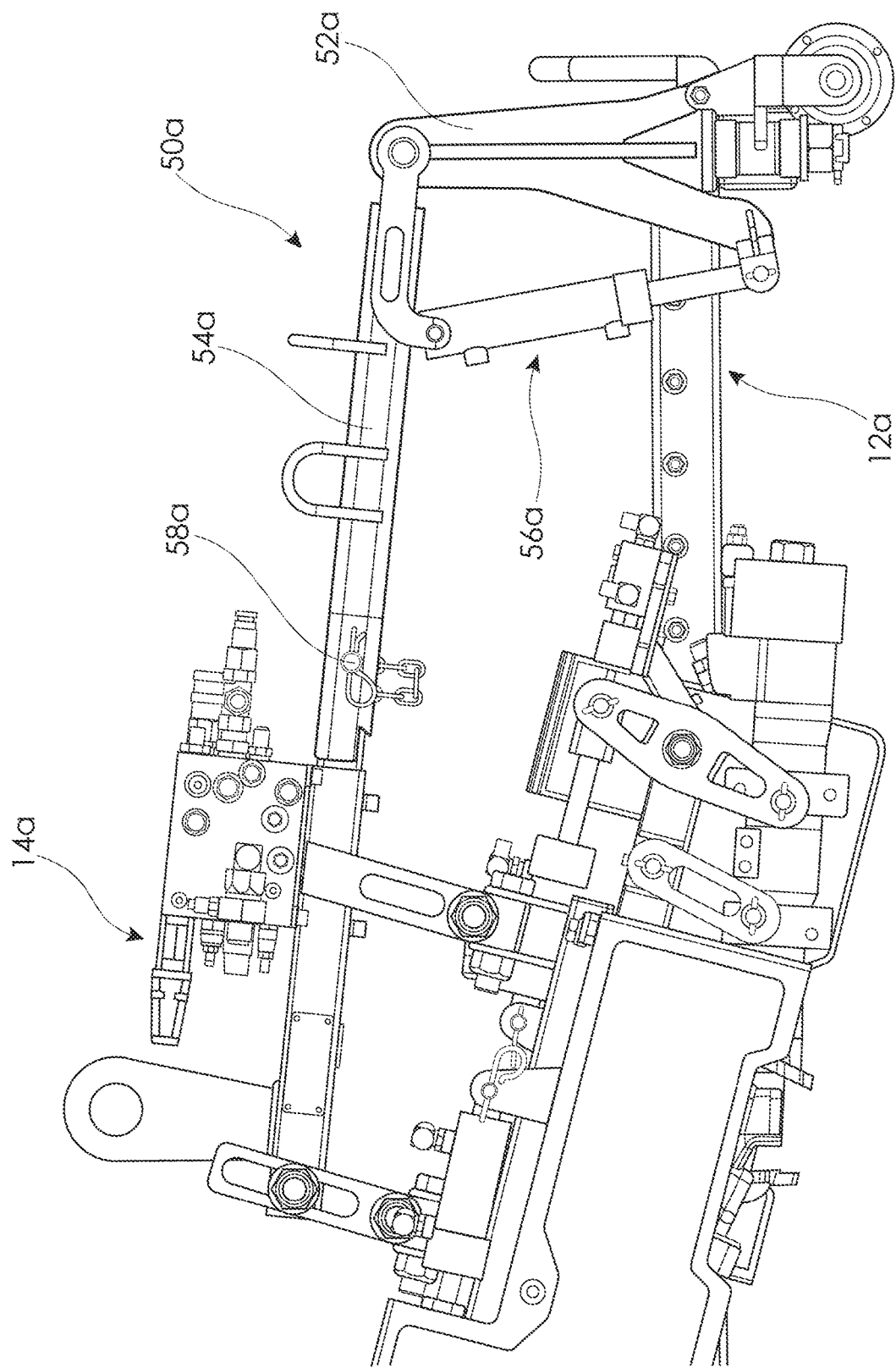
FIG. 7 is an enlarged side elevation of part of a workhead mounted to a boom assembly associated with one carriage of a railway track trolley according to the preceding embodiment.
Figure 8:
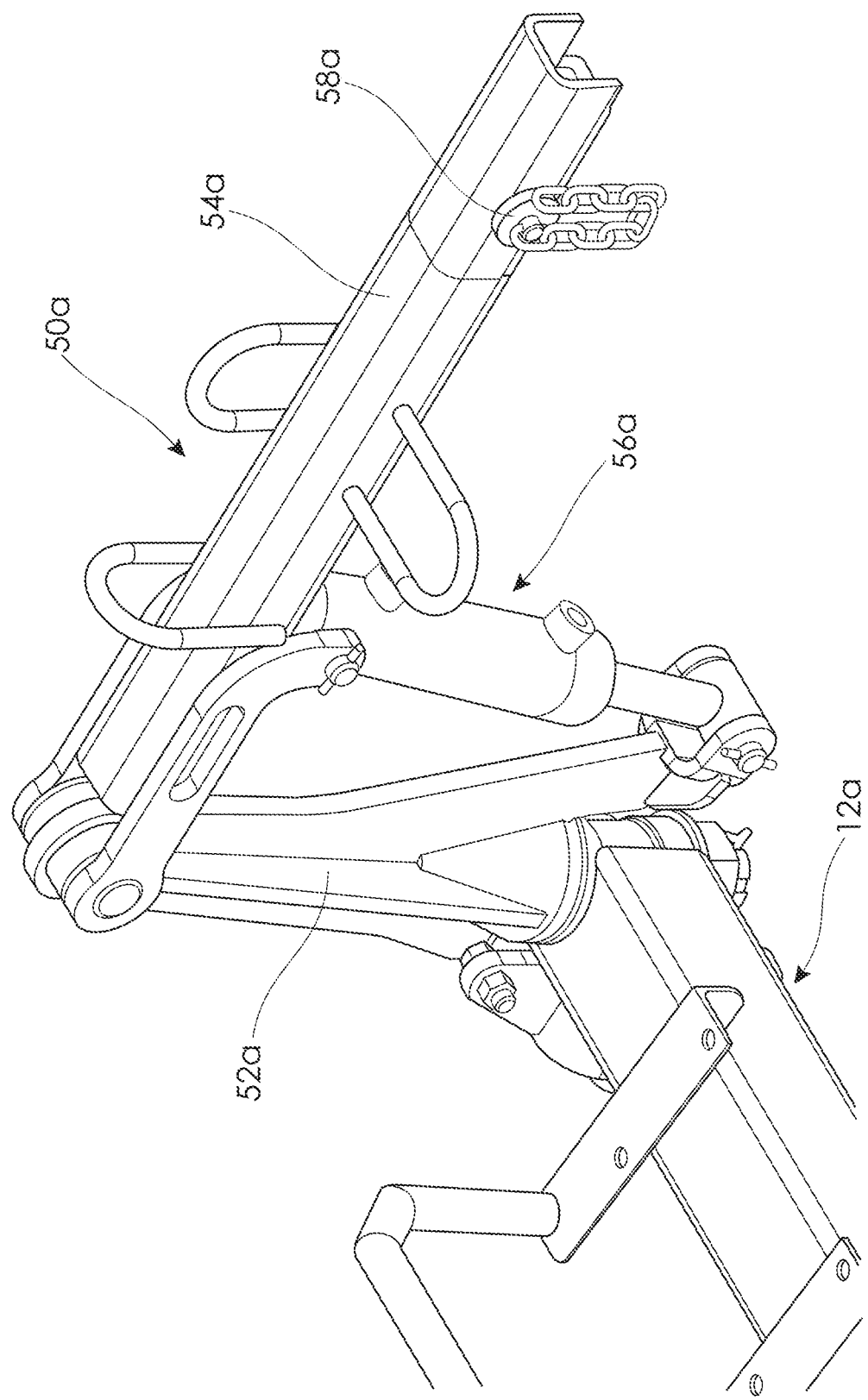
FIG. 8 is an enlarged perspective view of part of the boom assembly and carriage taken from FIG. 7.

As best seen in FIGS. 7 and 8 the workhead such as 14a is mounted to the respective 12a via a boom assembly 50a. The boom assembly 50a of this embodiment includes a pedestal 52a connected to the carriage 12a. The boom assembly 50a also includes a boom 54a pivotally mounted to the pedestal 52a. The workhead 14a extends from and is detachably mounted to a distal end of the boom 54a. The boom assembly 50a includes biasing means in the form of a hydraulically activated cylinder 56a coupled between the carriage 12a and the boom 54a to urge it upward in supporting the weight of the associated workhead 14a. In this example the workehad 14a is detachably mounted to the boom 54a via removable pin 58a.

In this embodiment the workhead such as 14a is designed for the removal of railway track fastener clips (not designated). The applicant's international patent application no. PCT/AU2011/001392 together with its national equivalents provides a description of the various components associated with this style of workhead such as 14a. The applicant's Australian complete patent application no. 2017203818 and its foreign equivalents describes another example of an appropriate workhead for use in conjunction with the railway track trolley 10 of this embodiment. The disclosures of these earlier patent applications in the name of the applicant are to be considered included herein by these references.

Although not illustrated the railway track trolley 10 of this embodiment is powered for activation of the workhead such as 14a via an associated power source. The power source may be a power take off from a train located in close proximity to the trolley 10. In this example the carriage of the train may provide coverage for personnel operating the workhead associated with the trolley 10. Alternatively the power source may be mounted local to the trolley 10, for example on one of the carriages or the coupling assembly. The power source may be hydraulic, pneumatic or electrical including electrical actuators. The power source may include an electric power pack or rechargeable battery.

In another aspect the invention is directed to a railway track trolley such as 10 of the preceding embodiment including to the carriage 12a and 12b, the boom assembly such as 50a, and the workhead such as 14a coupled to the boom assembly 50a. In this aspect the boom assembly 50a includes biasing means in the form of the hydraulically activated cylinder such 56a which in this embodiment is mounted at its opposing ends to the base of the pedestal 52a and the boom 54a, respectively. The hydraulically activated cylinder 56a functions to urge the boom 54a upward in supporting the weight of the workhead 14a.

Figure 9:
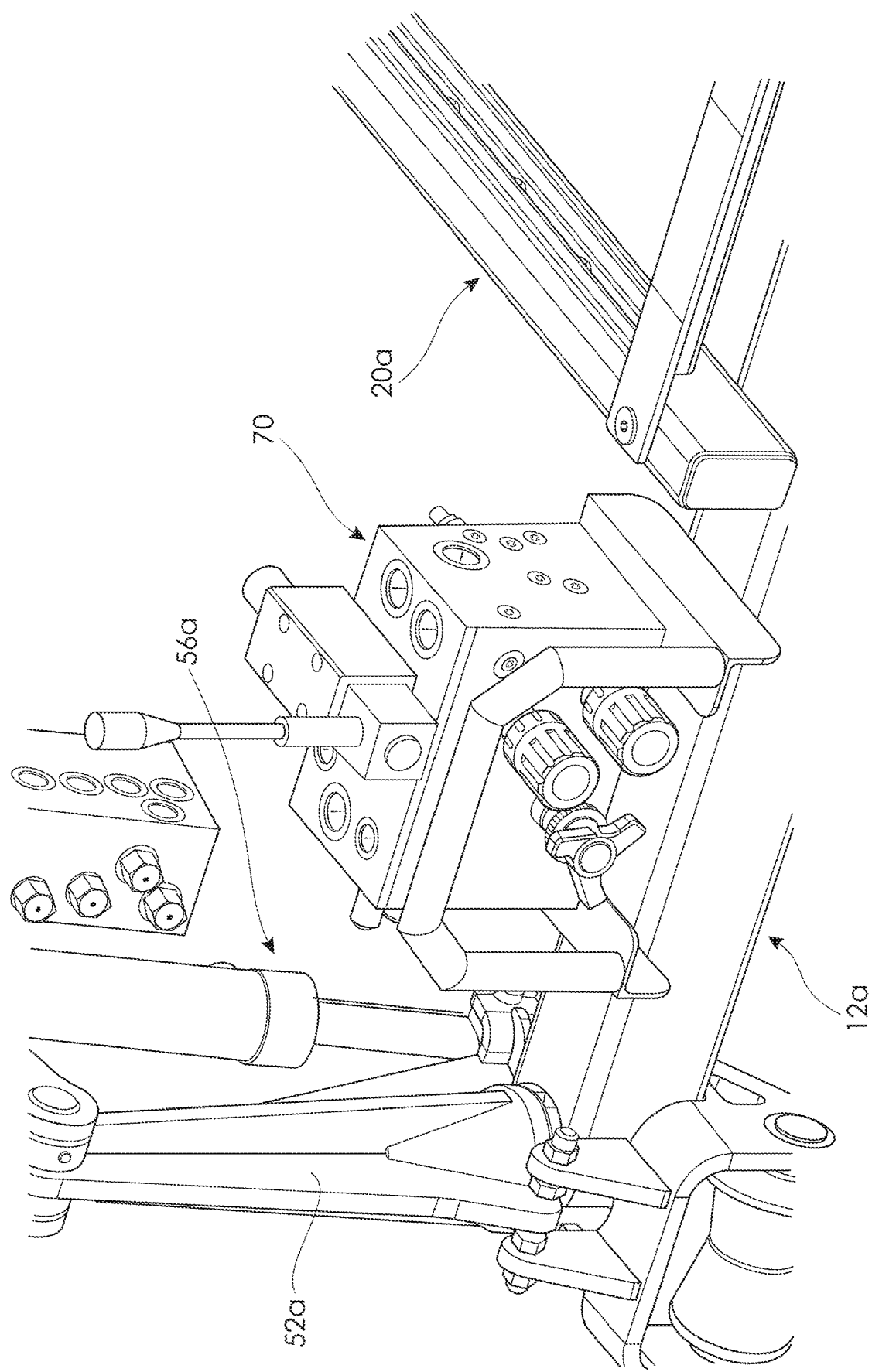
FIG. 9 is a perspective view of part of the carriage and boom assembly of FIGS. 7 and 8 together with a hydraulic control circuit of the preceding embodiment.

In both aspects of the invention the hydraulically activated cylinder 56a is operatively coupled to a hydraulic control circuit including a manifold assembly 70 as best seen in FIG. 9. The hydraulically activated cylinder 56a together with the 14a are operatively coupled to the manifold assembly 70 via hydraulic hoses (not shown). The manifold assembly 70 is also connected to the hydraulic power source such as the power take off from the train located in close proximity to the trolley 10. In operation, the hydraulic control circuit serves two primary functions:

1. it activates the workhead 14*a* which in this embodiment removes railway clip fasteners in accordance with the applicant's prior art;
2. it effectively suspends or floats the workhead 14*a* from the boom assembly 50*a* requiring minimal effort for an operator to operate the workhead 14*a*.

Figure 10:
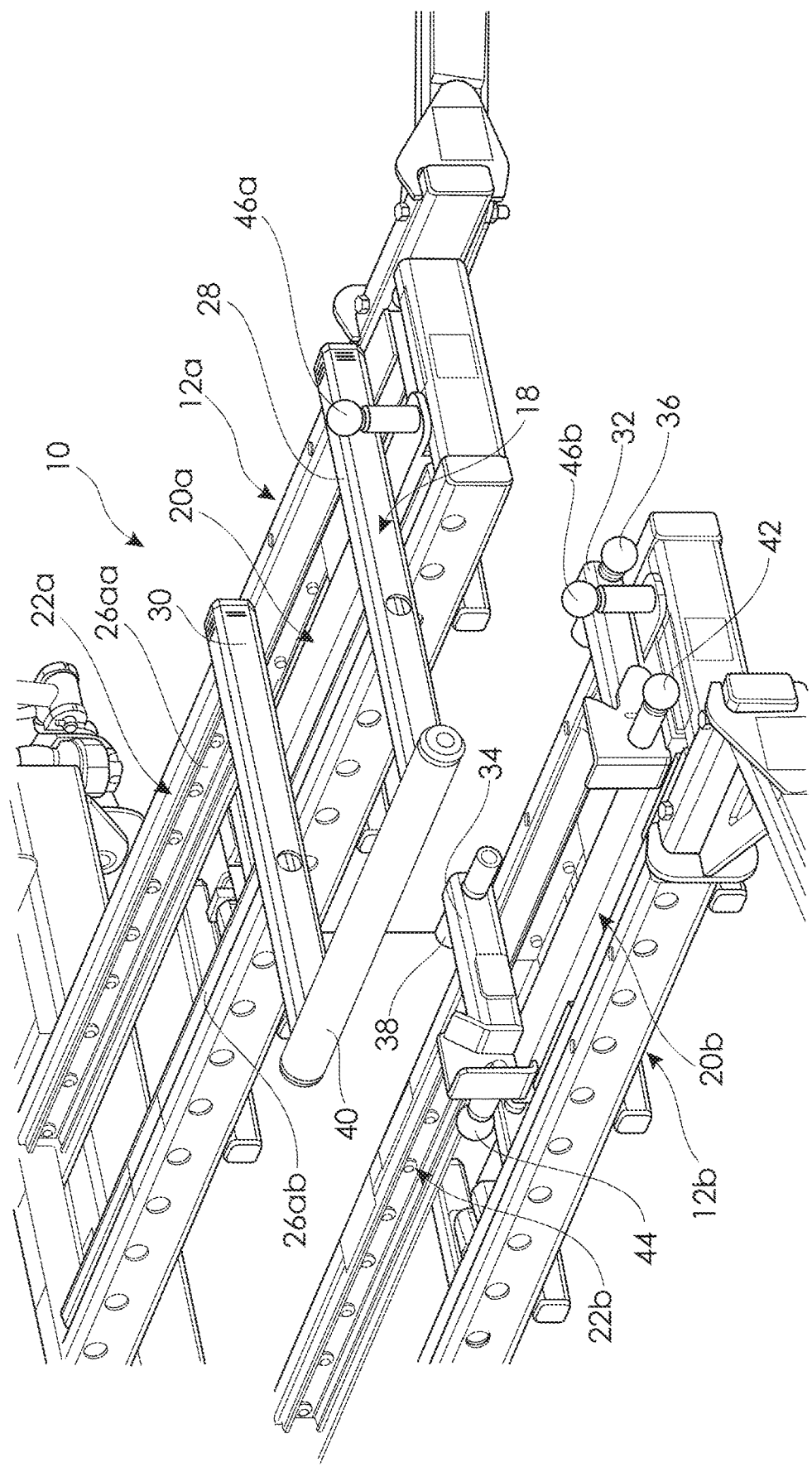
FIG. 10 is an exploded perspective view of part of the coupling assembly and the pair of carriages taken from the preceding embodiment.

As best seen in FIG. 10 the railway track trolley 10 of this embodiment is demountable for ease of transportation. In dismantling the railway track trolley 10 the following sequence of steps are involved:
1. the retractable locks 36 and 38 are released from the respective crossbeams 28 and 30 permitting hinging of the cars 20*a/b* relative to one another about the longitudinal member 40;
2. the releasable locks 42 and 44 are disengaged from the longitudinal member 40 allowing separation of the cars 20*a/b* and the respective carriages 12*a/b*.

In operation the railway track trolley 10 can operate in three modes, namely:
1. simultaneous movement of the carriages 12*a* and 12*b* with the coupling assembly 18 locked to both carriages 12*a/b* via the releasable plungers 46*a/b* of respective cars 20*a/b*;
2. independent movement of each of the carriages 12*a/b* and their associated workheads 14*a/b* with limited travel wherein the coupling assembly 18 permits sliding movement of the carriages 12*a/b* relative to one another with one only of the carriages such as 12*b* locked to the car 20*b* via its releasable plunger 46*b*;
3. independent movement of the carriages 12*a/b* and their associated workheads 14*a/b* which float with full travel in a shuttle action with the coupling assembly 18 released from both of the carriages 12*a/b*.

Now that a preferred embodiment of a railway track trolley has been described it will be apparent to those skilled in the art that it has the following advantages:
1. the trolley permits independent operation of separate workheads dedicated to respective of a pair of railway tracks and associated fasteners which means that operators are not required to synchronise removal/installation of the fasteners;
2. the trolley allows operation of separate workheads in concert improving productivity by motivating operators working together;
3. the trolley permits independent operation of workheads which can be moved independent of one another to separately align with fasteners to be removed or installed even when the associated sleeper is not square to the railway track;
4. the trolley is designed to control the height of a workhead which then effectively floats under the influence of appropriate biasing means;
5. the trolley can be demountable wherein lifting requirements are reduced by dismantling the trolley having removed the workhead, and lending itself to relatively compact transportation;
6. the workhead can be powered by an external power source without requiring the power source to counterbalance the workhead.

Those skilled in the art will appreciate that the invention as described herein is susceptible to variations and modifications other than those specifically described. For example, the workhead may depart from the clip removal system illustrated and extend to other tools and implements associated with maintenance or construction of railway track. The specific construction of the coupling assembly may vary from the dual car of the preferred embodiment provided independent movement of the pair of carriages is possible. All such variations and modifications are to be considered within the scope of the present invention the nature of which is to be determined from the foregoing description.

The invention claimed is:

1. A railway track trolley comprising:
a pair of carriages each located on respective of a pair of railway tracks, the carriages being interconnected to permit independent sliding relative to one another;
a workhead mounted to at least one of the pair of carriages which is moved along the railway track on which it is located wherein the workhead is adapted to implement work at said railway track; and
a coupling assembly slidably mounted to, and located between, the pair of carriages for their interconnection,
wherein the coupling assembly includes a pair of cars secured to one another and arranged to slide in concert within a corresponding traveller part of the respective pair of carriages.

2. The trolley as claimed in claim 1 wherein the pair of cars are retained by respective of the traveller parts of the pair of carriages for their independent sliding movements in a shuttle action.

3. The trolley as claimed in claim 1 wherein the pair of cars are detachably secured to one another to permit separation of the pair of carriages.

4. The trolley as claimed in claim 1 wherein the coupling assembly includes locking means arranged to cooperate with one or both of the pair of carriages to restrict sliding movement of one or both of said carriages relative to the coupling assembly.

5. The trolley as claimed in claim 4 wherein the locking means includes a locking element dedicated to each of the cars for locking engagement with the respective carriage whereby locking one only of the locking elements restricts the range of sliding movement of the carriages relative to one another.

6. The trolley as claimed in claim 1 wherein the trolley is powered for activation of the workhead via an associated power source.

7. The trolley as claimed in claim 6 wherein the associated power source is a power takeoff from a train located in close proximity to the trolley.

8. A railway track, trolley comprising:
a pair of carriages each located on respective of a pair of railway tracks, the carriages being interconnected to permit independent sliding relative to one another;
a workhead mounted to at least one of the pair of carriages which is moved along the railway track on which it is located wherein the workhead is adapted to implement work at said railway track,
wherein the workhead is mounted to the carriage via a boom assembly connected to the carriage, and
wherein the boom assembly includes a pedestal connected to the carriage and from which a boom is pivotally mounted, the workhead mounted to an end of the boom.

9. The trolley as claimed in claim 8 wherein the boom assembly includes biasing means coupled between the carriage and the boom to urge it upward in supporting the weight of the associated workhead.

10. The trolley as claimed in claim 9 wherein the biasing means includes a hydraulically activated cylinder located between the boom and the carriage.

\* \* \* \* \*